United States Patent
Nakagawa

(10) Patent No.: US 8,654,642 B2
(45) Date of Patent: Feb. 18, 2014

(54) WIRELESS PACKET TRANSMISSION APPARATUS AND PACKET PRIORITY CONTROL SCHEDULING METHOD

(75) Inventor: Koichi Nakagawa, Tokyo (JP)

(73) Assignee: NEC Corporation, Tokyo (JP)

(*) Notice: Subject to any disclaimer, the term of this patent is extended or adjusted under 35 U.S.C. 154(b) by 112 days.

(21) Appl. No.: 13/147,659

(22) PCT Filed: Feb. 9, 2010

(86) PCT No.: PCT/JP2010/051845
§ 371 (c)(1),
(2), (4) Date: Aug. 3, 2011

(87) PCT Pub. No.: WO2010/101002
PCT Pub. Date: Sep. 10, 2010

(65) Prior Publication Data
US 2012/0002618 A1    Jan. 5, 2012

(30) Foreign Application Priority Data
Mar. 2, 2009  (JP) ................ 2009-048024

(51) Int. Cl.
*H04J 3/14*   (2006.01)
(52) U.S. Cl.
USPC ............................................. 370/235
(58) Field of Classification Search
USPC ............................................. 370/329
See application file for complete search history.

(56) References Cited

U.S. PATENT DOCUMENTS

| | | | |
|---|---|---|---|
| 2003/0152083 A1* | 8/2003 | Nagata et al. | 370/395.4 |
| 2005/0063392 A1* | 3/2005 | Ofuji et al. | 370/395.42 |
| 2006/0198338 A1* | 9/2006 | Ishii et al. | 370/329 |
| 2006/0242319 A1* | 10/2006 | Sang et al. | 709/240 |
| 2007/0070895 A1* | 3/2007 | Narvaez | 370/230 |
| 2007/0153690 A1* | 7/2007 | Stanwood et al. | 370/230 |
| 2008/0209494 A1* | 8/2008 | Dravida et al. | 725/129 |

FOREIGN PATENT DOCUMENTS

| | | |
|---|---|---|
| CN | 1411221 A | 4/2003 |
| CN | 101060474 A | 10/2007 |
| JP | 2001345815 A | 12/2001 |
| JP | 20040007029 A | 1/2004 |

(Continued)

OTHER PUBLICATIONS

International Search Report for PCT/JP2010/051845 mailed May 18, 2010.
L. Chen et al., "Performance of a nobel wireless QoS proposed for broadband CDMA packet communication systems", Vehicular Technology Conference, IEEE, May 2004, pp. 2517-2521.

(Continued)

*Primary Examiner* — Chirag Shah
*Assistant Examiner* — Amar Persaud
(74) *Attorney, Agent, or Firm* — Sughrue Mion, PLLC

(57) ABSTRACT

A wireless packet transmission apparatus of this invention includes a packet priority controller that controls the order of transmitting packets with different priorities, and an adaptive modulation controller that changes the modulation scheme of the packets. The packet priority controller includes: a schedule selector that, when a modulation scheme is changed, with respect to packets with a priority of a predetermined value or more, provisionally sets a strict priority control scheme; and a comparison section that compares the transmission rate of the packets for which the strict priority control scheme is provisionally set and the transmission rate of the wireless packet transmission apparatus that is determined by the modulation scheme that has been changed by the adaptive modulation controller. Based on the comparison result, the schedule selector determines whether or not to set the strict priority control scheme for the packets for which the strict priority control scheme is provisionally set.

8 Claims, 4 Drawing Sheets

(56) References Cited

FOREIGN PATENT DOCUMENTS

| | | |
|---|---|---|
| JP | 2004241952 A | 8/2004 |
| JP | 2005509308 A | 4/2005 |
| JP | 2007028638 A | 2/2007 |
| JP | 2008042850 A | 2/2008 |

OTHER PUBLICATIONS

Chinese Office Action for CN Application No. 201080008980.X issued on Sep. 24, 2013 with English Translation.

* cited by examiner

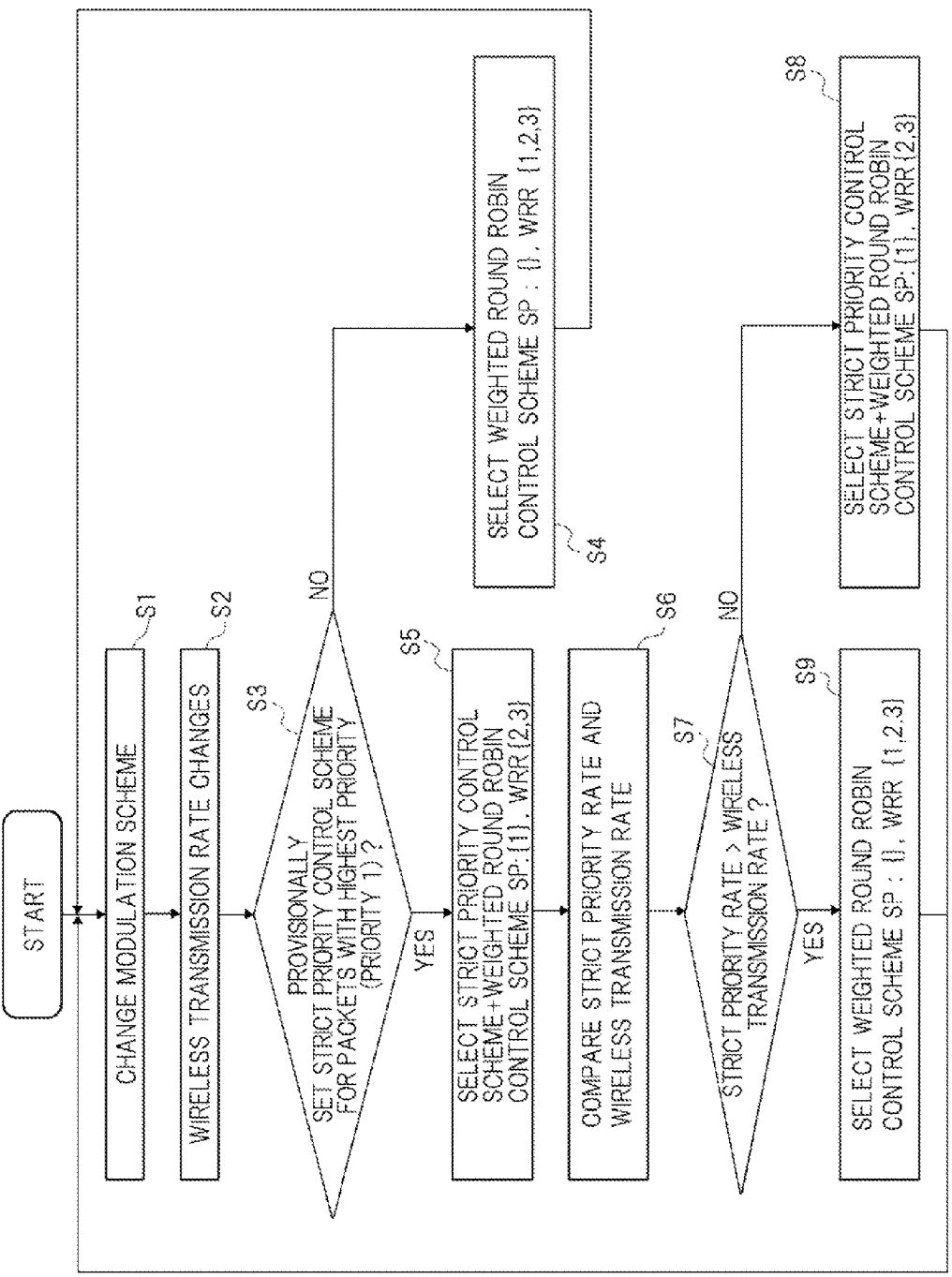

WIRELESS PACKET TRANSMISSION APPARATUS AND PACKET PRIORITY CONTROL SCHEDULING METHOD

TECHNICAL FIELD

The present invention relates to a wireless packet transmission apparatus that has a packet priority control function that controls the order of transmitting packets with different priorities and an adaptive modulation control function that selects a packet modulation scheme according to the status of a wireless line, and a packet priority control scheduling method.

BACKGROUND ART

In recent years, packet transmission over Ethernet (registered trademark) is being used for a variety of purposes, and various kinds of data including audio, image, and moving image data are being transmitted thereby. The quality of service (QoS) to be satisfied by these various kinds of data differs according to the kind of data. Hence, packets that are constituted by the respective kinds of data have different priorities that depend on the kind of data.

Therefore, recently, some wireless packet transmission apparatuses that perform packet transmission have a packet priority control function that controls the order of transmitting packets with different priorities. FIG. 1 illustrates a common configuration of a packet priority controller that is applied to a wireless packet transmission apparatus that has a packet priority control function.

Packet priority controller 10 shown in FIG. 1 includes classification controller 11, schedule selector 12, and packet buffer 13.

Classification controller 11 classifies the priorities of packets to be transmitted that are input from a packet input section (unshown), in accordance with a priority that is set in a header of each packet. Classification controller section 11 stores packets that have undergone priority classification in transmission queues of packet buffer 13 that correspond to the respective priority classes.

Schedule selector 12 selects a priority control schedule in accordance with the packets that are stored in the transmission queues of packet buffer 13.

In this case, the term "priority control schedule" refers to a schedule that, with respect to packets with different priorities, sets a control scheme that determines the order of transmitting the packets for each packet.

Therefore, schedule selector 12 selects a priority control schedule by setting respective control schemes for packets with different priorities. For example, with respect to packets with the highest priority, schedule selector 12 sets a strict priority (SP) control scheme that transmits the packets with the highest priority irrespective of the existence of other packets, and with respect to other packets, schedule selector 12 sets a weighted round robin (WRR) control scheme that transmits the packets in an order that is determined by a ratio that is set by assigning weights that are in accordance with the priorities of the respective packets to a ratio at which the respective packets are transmitted.

In the following description, the term "priority control" refers to control of the order of transmitting packets with different priorities.

Packet buffer 13 performs readout of packets stored in transmission queues in accordance with the priority control schedule that is selected by schedule selector 12.

Thus, by including packet priority controller 10 that controls the order of transmitting packets with different priorities, the wireless packet transmission apparatus can transmit packets while taking into consideration the priorities of the packets.

In this case, packets for which the strict priority control scheme has been set are transmitted by the wireless packet transmission apparatus at a transmission rate to be satisfied by the packets. In contrast, packets for which the weighted round robin control scheme has been set are transmitted by the wireless packet transmission apparatus at a transmission rate that is determined after also taking into consideration a transmission rate to be satisfied by other packets with different priorities. In this case, although there may be instances where, depending on the transmission rate (hereunder, referred to as "wireless transmission rate") at which the wireless packet transmission apparatus can perform packet transmission, the wireless packet transmission apparatus can not transmit packets at a transmission rate to be satisfied by packets for which the weighted round robin control scheme is set, the wireless packet transmission apparatus can transmit packets of all priorities. In this connection, the term "transmission rate" refers to a rate that is represented, for example, by bps (bits per second) that is a unit that shows a number of bits that are transmitted in one second or the like.

As described above, high priority packets for which the strict priority control scheme has been set are transmitted with priority irrespective of the existence of other packets.

Consequently, within the range of the wireless transmission rate of its own apparatus, the wireless packet transmission apparatus transmits high priority packets, for which the strict priority control scheme has been set, at a transmission rate (hereunder, referred to as "strict priority rate") to be satisfied by packets for which the strict priority control scheme has been set.

Therefore, if the strict priority rate is higher than the wireless transmission rate, low priority packets are not transmitted at all, and communication of low priority packets is disconnected.

In this case, with a protocol such as TCP/IP in which an error is determined when it is detected that a state in which communication is disconnected has continued for a certain time period or more, because the determination of an error can be prevented if even a small number of packets are transmitted, complete disconnection of communication ought to be avoided even in the case of low priority packets.

In this connection, Patent Document 1 (JP2001-345815A) discloses a bandwidth guarantee control apparatus that guarantees a transmission rate in accordance with a priority of each packet even when the kinds or number of items of data that are transmitted vary.

More specifically, the bandwidth guarantee control apparatus disclosed in Patent Document 1 guarantees transmission rates to be satisfied by packets in the order of highest priority, and when transmission rates to be satisfied by low priority packets can not be guaranteed, among packets excluding high priority packets for which it is always necessary to satisfy a certain transmission rate, the bandwidth guarantee control apparatus increases the priority of packets for which the transmission rate could not be guaranteed. In accordance with the priority of the respective packets, the bandwidth guarantee control apparatus guarantees the transmission rate of each packet within a range of a remaining transmission rate that is obtained by subtracting the transmission rate to be satisfied by high priority packets from the wireless transmission rate.

DISCLOSURE OF THE INVENTION

Some wireless packet transmission apparatuses have an adaptive modulation control function that changes a packet modulation scheme according to the status of a wireless line to improve the wireless communication quality.

A wireless packet transmission apparatus that has an adaptive modulation control function, for example, can transmit four values (two bits) at one time when the modulation scheme is QPSK (Quadrature Phase Shift Keying), and can transmit sixteen values (four bits) at one time when the modulation scheme is 16-QAM (16 Quadrature Amplitude Modulation). Therefore, if the modulation scheme is changed from 16-QAM to QPSK, the wireless transmission rate of the wireless packet transmission apparatus is halved. More specifically, the wireless transmission rate of a wireless packet transmission apparatus changes in accordance with a modulation scheme change.

However, the bandwidth guarantee control apparatus disclosed in Patent Document 1 is an apparatus that changes the priority of packets while the wireless transmission rate is constant, and does not give any consideration to a change in the wireless transmission rate that is caused by a change in the modulation scheme.

Therefore, for example, when the modulation scheme is changed from 16-QAM to QPSK, as described above, the wireless transmission rate is halved. In such a case, if a transmission rate to be satisfied by high priority packets occupies all of the wireless transmission rate or a large portion thereof, there will be no remaining transmission rate that can guarantee transmission of low priority packets, or the remaining transmission rate will be extremely small. Consequently, there is the problem that even if it is also attempted to guarantee a transmission rate for low priority packets by changing the priority thereof, it is not possible to guarantee a sufficient transmission rate, and thus communication of low priority packets is disconnected.

SUMMARY OF THE INVENTION

An object of the present invention is to provide a wireless packet transmission apparatus and a packet priority control scheduling method that can prevent communication of low priority packets being disconnected even when the wireless transmission rate of the wireless packet transmission apparatus varies simultaneous with a change in a modulation scheme that is caused by adaptive modulation control.

To achieve the above described object, a wireless packet transmission apparatus according to the present invention includes a packet priority control that controls the order of transmitting packets with different priorities, and an adaptive modulation controller that changes the modulation scheme of the packets according to the status of the wireless line, said packet priority controller including:

a schedule selector that, when a modulation scheme is changed by said adaptive modulation controller, with respect to packets with a priority of a predetermined value or more among the packets, provisionally sets a strict priority control scheme which indicates that the packets with a priority of a predetermined value or more are transmitted with priority over other packets, as a control scheme that determines an order of transmitting the packets with a priority of a predetermined value or more, and a comparison section that compares a strict priority rate that is the transmission rate of packets for which the strict priority control scheme is provisionally set by said schedule selector and a wireless transmission rate that is the transmission rate of said wireless packet transmission apparatus that is determined by a modulation scheme that is changed by said adaptive modulation controller, wherein, based on a comparison result obtained by said comparison section, said schedule selector determines whether to set the strict priority control scheme as the control scheme for the packets for which the strict priority control scheme is provisionally set.

To achieve the above described object, a packet priority control scheduling method according to the present invention is a method that is applied to a wireless packet transmission apparatus that controls the order of transmitting packets with different priorities and also that changes the modulation scheme of the packets in accordance with a status of the wireless line, the method including:

when the modulation scheme is changed, with respect to packets with a priority of a predetermined value or more among the packets, provisionally setting a strict priority control scheme, which indicates that the packets with a priority of a predetermined value or more are transmitted with priority over other packets, as a control scheme that determines the order of transmitting the packets with a priority of a predetermined value or more;

comparing a strict priority rate that is a transmission rate of packets for which the strict priority control scheme is provisionally set and a wireless transmission rate that is a transmission rate of said wireless packet transmission apparatus that is determined by the changed modulation scheme; and based on the comparison result, determining whether to set the strict priority control scheme as the control scheme for the packets for which the strict priority control scheme is provisionally set.

According to the present invention, when a wireless transmission rate changes simultaneous with a change in a modulation scheme that is caused by adaptive modulation control, based on a result of a comparison between a strict priority rate of packets for which a strict priority control scheme is provisionally set and a wireless transmission rate, the wireless packet transmission apparatus determines whether to set the strict priority control scheme with respect to the packets for which the strict priority control scheme is provisionally set.

Consequently, a situation in which the strict priority rate occupies all of the wireless transmission rate is avoided, a situation in which only packets, for which the strict priority control scheme is set, are transmitted does not occur, and it is possible to prevent the disconnection of communication of low priority packets.

BRIEF DESCRIPTION OF DRAWINGS

FIG. 4 is a flowchart that illustrates an example of operations that select a priority control schedule simultaneous with a change of a modulation scheme that is caused by adaptive modulation control at the wireless packet transmission apparatus shown in FIG. 2.

DESCRIPTION OF EMBODIMENTS

Hereunder, a mode for carrying out the present invention is described with reference to the drawings.

Figure 1:
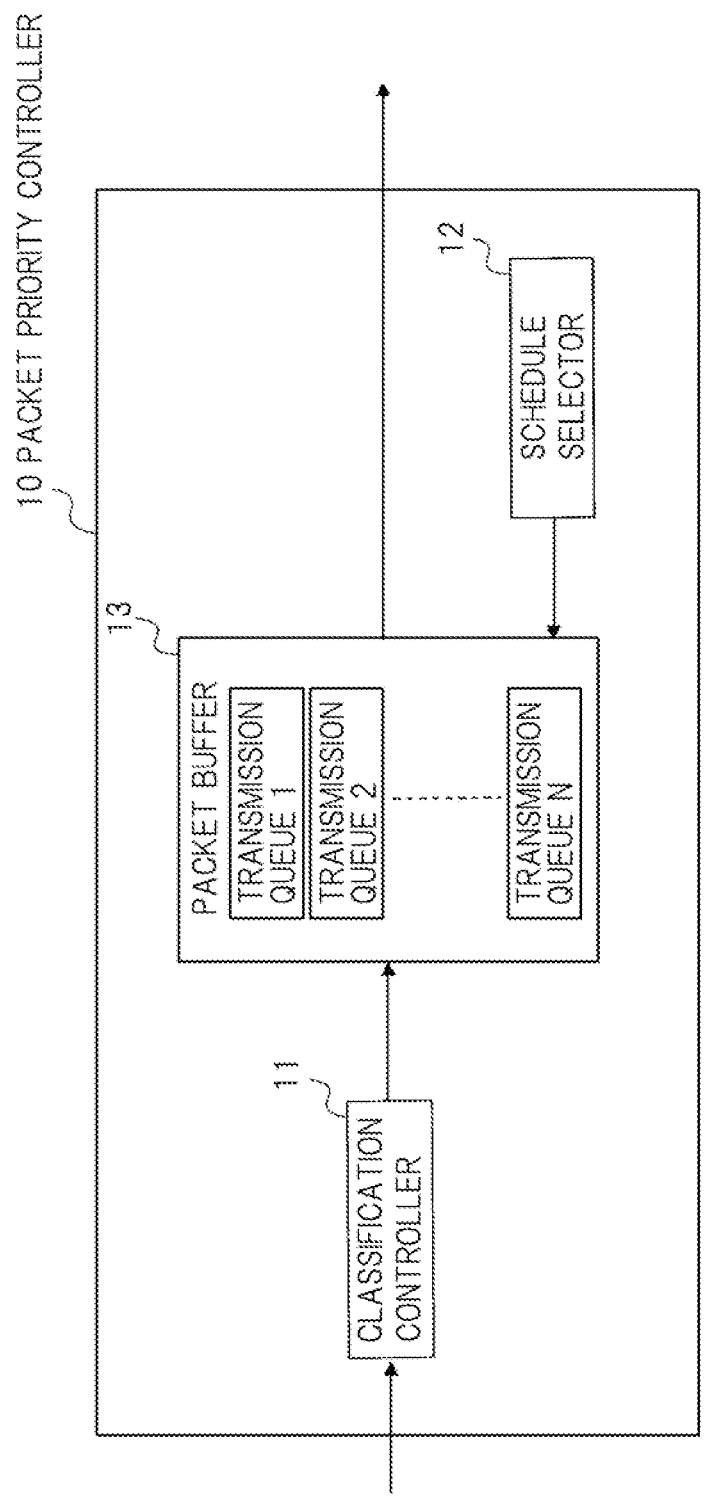
FIG. 1 is a block diagram that illustrates a configuration of a common packet priority controller.
Figure 2:
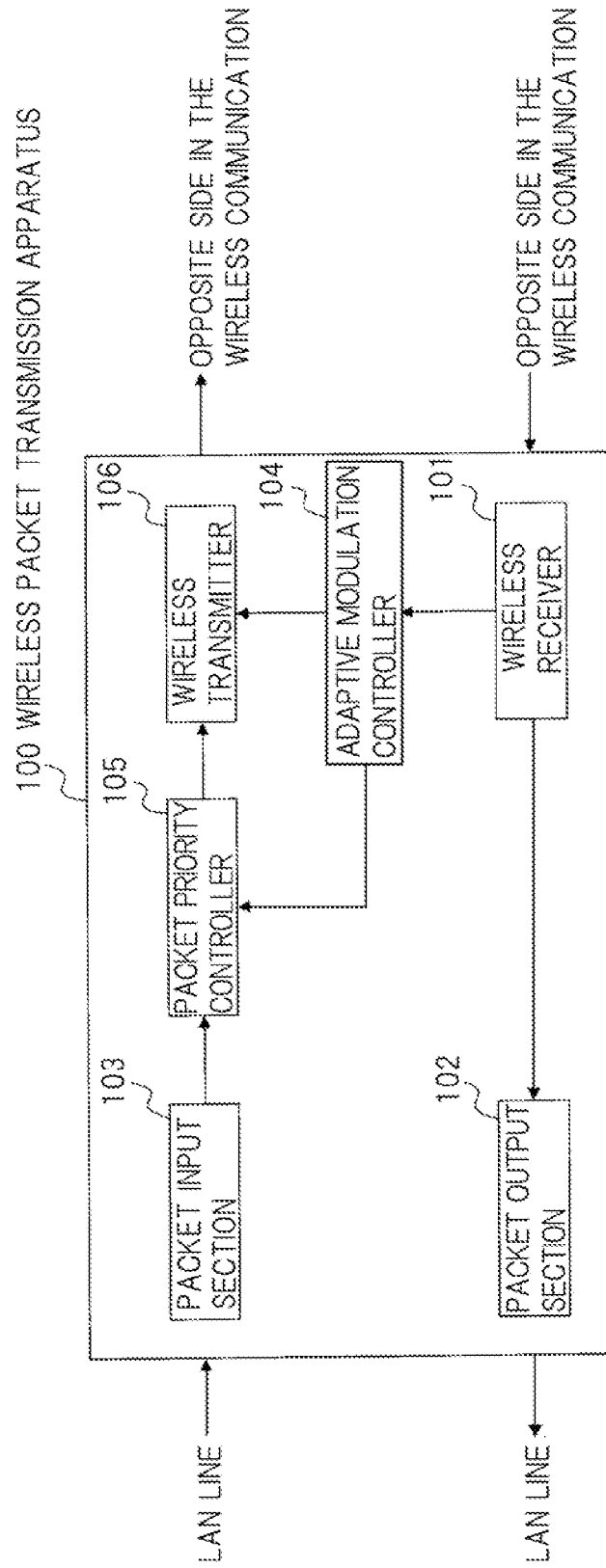
FIG. 2 is a block diagram that illustrates a configuration of a wireless packet transmission apparatus according to an exemplary embodiment.

FIG. 2 is a block diagram that illustrates a configuration of wireless packet transmission apparatus 100 according to an exemplary embodiment.

Wireless packet transmission apparatus 100 shown in FIG. 2 includes wireless receiver 101, packet output section 102, packet input section 103, adaptive modulation controller 104, packet priority controller 105, and wireless transmitter 106.

Wireless receiver 101 demodulates a signal that is received from an opposite side in the wireless communication that is a wireless communication counterpart, extracts packets from a signal in a wireless transmission format, and outputs the packets to packet output section 102. Wireless receiver 101 also detects the status of a wireless line, and outputs wireless line information that shows the status of the wireless line to adaptive modulation controller 104.

Packet output section 102 encodes packets that are outputted from wireless receiver 101, and outputs the packets to a LAN line side.

Packet input section 103 decodes packets to be transmitted that are inputted from the LAN line side, and outputs the packets to packet priority controller 105.

Based on the wireless line information that is outputted from wireless receiver 101, adaptive modulation controller 104 changes the packet modulation scheme so that a predetermined wireless communication quality can be guaranteed, and outputs modulation scheme information that shows the changed modulation scheme to wireless transmitter 106. Adaptive modulation controller 104 also outputs wireless transmission rate information that shows the wireless transmission rate of wireless packet transmission apparatus 100 that is determined by the changed modulation scheme to packet priority controller 105.

Packet priority controller 105 performs priority control that controls the order of transmitting packets with different priorities that are outputted from packet input section 103. More specifically, packet priority controller 105 selects a priority control schedule for packets with different priorities by setting respective control schemes for the packets, and outputs the packets in an order determined by the selected priority control schedule to wireless transmitter 106. In this connection, the manner in which packet priority controller 105 selects a priority control schedule is described later.

Wireless transmitter 106 converts the packets that are outputted from packet priority controller 105 into signals in a wireless transmission format, and thereafter performs modulation with the modulation scheme that is indicated in the modulation scheme information outputted from adaptive modulation controller 104, and outputs the signals to the opposite side in the wireless communication that is the wireless communication counterpart.

Next, the configuration of packet priority controller 105 is described.

Figure 3:
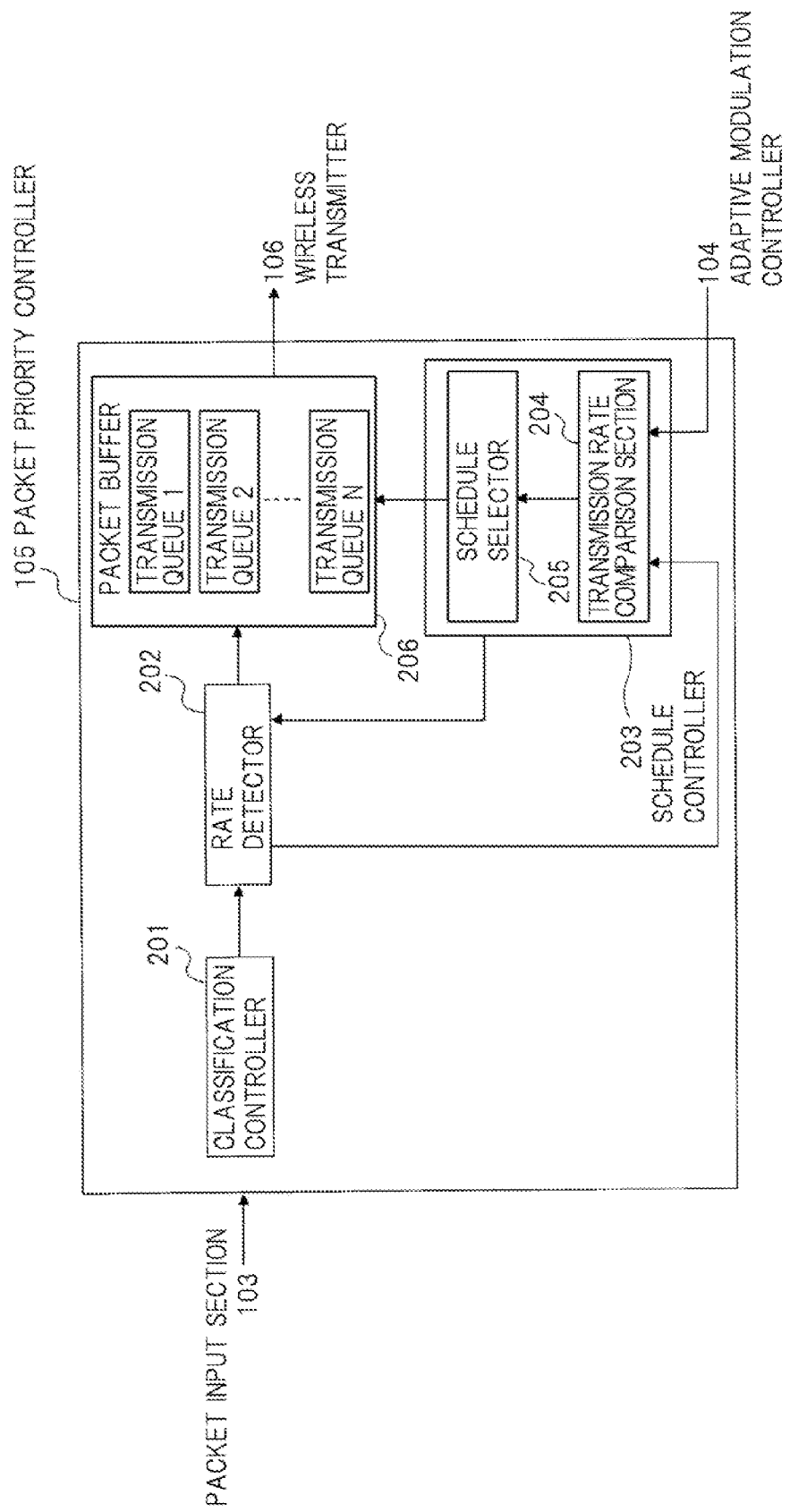
FIG. 3 is a block diagram that illustrates a configuration of a packet priority controller shown in FIG. 2.

FIG. 3 is a block diagram that shows the configuration of packet priority controller 105.

Packet priority controller 105 shown in FIG. 3 includes classification controller 201, rate detector 202, schedule controller 203, and packet buffer 206.

Schedule controller 203 includes transmission rate comparison section 204 and schedule selector 205.

Classification controller 201 classifies the priorities of packets according to a priority that is set in the header of each packet that is outputted from packet input section 103. Classification controller 201 outputs packets that have undergone priority classification to rate detector 202.

Based on priority control setting information that shows a priority control schedule that is selected by schedule selector 205 that is described later, rate detector 202 outputs strict priority rate information that shows a strict priority rate of packets for which the strict priority control scheme has been set to transmission rate comparison section 204.

More specifically, when the strict priority control scheme is set for packets that have been outputted from classification controller 201, rate detector 202 outputs the transmission rate of the packets as strict priority rate information to transmission rate comparison section 204. In contrast, when the strict priority control scheme is not set for packets that have been outputted from classification controller 201, rate detector 202 outputs a rate value of zero as strict priority rate information to transmission rate comparison section 204.

Further, rate detector 202 stores packets that have undergone priority classification that have been output from classification controller 201 in transmission queues corresponding to respective priority classes of packet buffer 206.

Schedule controller 203 selects a priority control schedule in accordance with the packets that are stored in the transmission queues of packet buffer 206.

Schedule selector 205 provisionally selects a priority control schedule based on predetermined criteria, and outputs priority control setting information showing the priority control schedule that is provisionally selected to rate detector 202.

Transmission rate comparison section 204 compares the wireless transmission rate that is shown by the wireless transmission rate information that is outputted from adaptive modulation controller 104 and the strict priority rate that is shown by the strict priority rate information that is outputted from rate detector 202, and outputs a comparison result signal that shows the comparison result to schedule selector 205.

Schedule selector 205 selects a priority control schedule based on the comparison result signal outputted from transmission rate comparison section 204 and the provisionally selected priority control schedule.

Based on the selected priority control schedule, schedule selector 205 outputs, to packet buffer 206, readout control information that shows the order of reading out the packets stored in the transmission queues of packet buffer 206.

Schedule selector 205 also outputs priority control setting information that shows the selected priority control schedule to rate detector 202.

Based on the readout control information that is outputted from schedule selector 205, packet buffer 206 reads out packets stored in the transmission queues and outputs the packets to wireless transmitter 106.

Next, operations of wireless packet transmission apparatus 100 according to an exemplary embodiment are described in a manner that centers on operations to select a priority control schedule by packet priority controller 105.

FIG. 4 is a flowchart that illustrates an example of operations that select a priority control schedule simultaneous with a change of a modulation scheme that is caused by adaptive modulation control at wireless packet transmission apparatus 100 according to an exemplary embodiment.

In the following description, it is assumed that wireless packet transmission apparatus 100 transmits three kinds of packets with different priorities (priority 1, priority 2, and priority 3).

Further, it is assumed that wireless packet transmission apparatus 100 selects either a priority control schedule that sets a strict priority control scheme for packets with the highest priority (priority 1) and sets a weighted round robin control scheme for the other packets (priority 2 and priority 3), or a priority control schedule that sets a weighted round robin control scheme for packets of all priorities (priority 1, priority 2, and priority 3).

In the following description, a priority control schedule that sets a strict priority control scheme for packets with the highest priority (priority 1) and sets a weighted round robin control scheme for the other packets (priority 2 and priority 3) is represented by "SP: {1}, WRR: {2,3}", and a priority control schedule that sets a weighted round robin control scheme for packets of all priorities (priority 1, priority 2, and priority 3) is represented by "SP: { }, WRR: {1,2,3}".

Further, it is assumed that adaptive modulation controller 104 changes a packet modulation scheme to QPSK or 16-QAM in accordance with the status of a wireless line.

First, based on wireless line information that is outputted from wireless receiver 101, adaptive modulation controller 104 selects 16-QAM as the modulation scheme when the status of the wireless line is favorable, and selects QPSK as the modulation scheme when the quality of the wireless line is poor.

Next, when the wireless transmission rate changes (step S2) due to the modulation scheme being changed from QPSK to 16-QAM or from 16-QAM to QPSK by adaptive modulation controller 104 (step S1), schedule selector 205 determines whether to provisionally set the strict priority control scheme for packets with the highest priority (priority 1) (step S3). In this case, if the modulation scheme has changed from 16-QAM to QPSK, the wireless transmission rate of wireless packet transmission apparatus 100 is halved.

Various criteria are available as criteria for determining whether to provisionally set the strict priority control scheme. For example, by adopting a criterion whereby, when the modulation scheme has changed from QPSK to 16-QAM, the strict priority control scheme is provisionally set automatically for packets with a priority that is greater than or equal to a predetermined value, when the status of the wireless line improves from a poor quality state to a favorable state, the strict priority control scheme can be provisionally set automatically for packets with a priority that is greater than or equal to a predetermined value. In this connection, it is assumed that the criterion according to the present exemplary embodiment is that the strict priority control scheme is provisionally set automatically for packets with the highest priority (priority 1) when the modulation scheme has changed from QPSK to 16-QAM.

If schedule selector 205 determines not to provisionally set the strict priority control scheme for packets with the highest priority (priority 1) (step S3: No), schedule selector 205 selects "SP:{ }, WRR{1,2,3}" as the priority control schedule (step S4).

In contrast, if schedule selector 205 determines to provisionally set the strict priority control scheme for packets with the highest priority (priority 1) (step S3: Yes), schedule selector 205 sets the weighted round robin control scheme for other packets (priority 2 and priority 3), provisionally selects a priority control schedule "SP: {1}, WRR:{2,3}" (step S5), and outputs priority control setting information that shows the provisionally selected priority control schedule to rate detector 202.

Because the priority control setting information that is outputted from schedule selector 205 shows that the strict priority control scheme is set for packets with the highest priority (priority 1), rate detector 202 takes the transmission rate of the packets with the highest priority (priority 1) as the strict priority rate, and outputs strict priority rate information showing the strict priority rate to transmission rate comparison section 204.

Transmission rate comparison section 204 compares the wireless transmission rate shown by the wireless transmission rate information that has been outputted from adaptive modulation controller 104 and the strict priority rate shown by the strict priority rate information that has been outputted from rate detector 202 (step S6).

If the strict priority rate is not higher than the wireless transmission rate (step S7: No), transmission rate comparison section 204 outputs a "normal" comparison result signal that indicates that the strict priority rate is not higher than the wireless transmission rate to schedule selector 205.

Based on the comparison result signal outputted from transmission rate comparison section 204 and the priority control schedule that is provisionally selected in step S5, schedule selector 205 determines whether to set the strict priority control scheme with respect to the packets with the highest priority (priority 1).

In this case, since schedule selector 205 already decided to provisionally set the strict priority control scheme for the packets with the highest priority (priority 1), in step S5, schedule selector 205 has been provisionally selected "SP: {1}, WRR: {2,3}" as the priority control schedule.

Because a "normal" comparison result signal is output from transmission rate comparison section 204, schedule selector 205 determines that the strict priority control scheme is to be set for the packets with the highest priority (priority 1). That is, schedule selector 205 selects "SP: {1}, WRR:{2,3}" as the priority control schedule (step S8).

In contrast, if the strict priority rate is higher than the wireless transmission rate (step S7: Yes), since there is a possibility that only the packets (priority 1) for which the strict priority control scheme has been provisionally set will be transmitted and the packets (priority 2 and priority 3) for which the weighted round robin control scheme is set will not be transmitted at all, transmission rate comparison section 204 outputs an "alarm" comparison result signal that indicates that the strict priority rate is higher than the wireless transmission rate to schedule selector 205.

Since "alarm" is output as the comparison result signal, in order to prevent a situation in which packets (priority 2 and priority 3) for which the weighted round robin control scheme is set are not transmitted at all, schedule selector 205 determines that the strict priority control scheme will not be set for the packets with the highest priority (priority 1). That is, irrespective of the fact that "SP: {1}, WRR: {2,3}" has been provisionally selected as the priority control schedule in step S5, schedule selector 205 switches the control scheme for the packets with the highest priority (priority 1) from the strict priority control scheme to the weighted round robin control scheme and selects "SP: { }, WRR{1,2,3}" as the priority control schedule.

According to the present invention, when a wireless transmission rate changes simultaneous with a change of a modulation scheme due to adaptive modulation control, based on the result of a comparison between the strict priority rate of packets for which the strict priority control scheme has been provisionally set and the wireless transmission rate, wireless packet transmission apparatus 100 determines whether to set the strict priority control scheme for the packets for which the strict priority control scheme has been provisionally set.

Consequently, a situation in which the strict priority rate occupies all of the wireless transmission rate is avoided, a situation in which only packets for which the strict priority control scheme is set are transmitted does not occur, and it is possible to prevent the disconnection of communication of low priority packets.

Having described the invention of this application above with reference to an exemplary embodiment, it should be understood that the invention of this application is not limited to the above described exemplary embodiment. Various modifications that can be understood by those skilled in the art can be made to the configuration and details of the invention of this application within the scope of the invention of this application.

In this connection, although wireless packet transmission apparatus 100 in which a wireless transmission rate varies in accordance with adaptive modulation control is described as an example according to the present exemplary embodiment, the present invention is not limited thereto. For example, the present invention can also be applied to wireless packet transmission apparatus 100 that uses a policer that performs processing that discards packets that exceed the wireless transmission rate or a shaper that temporarily stores packets that exceed the wireless transmission rate.

In the case of wireless packet transmission apparatus 100 that uses a policer, wireless packet transmission apparatus 100 selects a priority control schedule by performing a comparison between the strict priority rate on the input side of the policer and the wireless transmission rate.

Further, in the case of wireless packet transmission apparatus 100 that uses a shaper, after the transmission rate on the output side of the shaper is caused to change in response to fluctuations in the wireless transmission rate of wireless packet transmission apparatus 100, wireless packet transmission apparatus 100 selects a priority control schedule by performing a comparison between a strict priority rate on the input side of a policer and the transmission rate on the output side of the shaper. Furthermore, when a committed information rate (CIR) that shows a minimum transmission rate to be guaranteed and an excess information rate (EIR) that shows a transmission rate that exceeds the CIR is set at the shaper, it is also possible for wireless packet transmission apparatus 100 to select a priority control schedule by performing a comparison between a total value of the CIR and EIR, and the wireless transmission rate.

Further, although an example in which a control scheme is switched from the strict priority control scheme to the weighted round robin control scheme has been described according to the present exemplary embodiment, the present invention is not limited thereto, and it is also possible to switch from the strict priority control scheme to a weighted fair queuing (WFQ) control scheme or a best effort control scheme instead of the weighted round robin control scheme.

Here, the term "weighted fair queuing control scheme" refers to a control scheme that transmits packets in an order that is determined by a ratio that is set by assigning weights in accordance with the priorities of the respective packets to a ratio at which the respective packets are transmitted, and the size of the respective packets. Further, the term "best effort control scheme" refers to a control scheme according to which packets are transmitted in the order of input from the LAN line side, irrespective of the priorities of the packets.

This application is based upon and claims the benefit of priority from Japanese Patent Application No. 2009-048024, filed Mar. 2, 2009, the entire contents of which are incorporated herein.

The invention claimed is:

1. A wireless packet transmission apparatus comprising:
 a wireless transmitter;
 a packet priority controller that controls an order of transmitting packets with different priorities, and an adaptive modulation controller that changes a modulation scheme of the packets according to a status of a wireless line, said packet priority controller comprising:
 a schedule selector that, when a modulation scheme is changed by said adaptive modulation controller, with respect to packets with a priority of a predetermined value or more among the packets, provisionally sets a strict priority control scheme, which indicates that the packets with a priority of a predetermined value or more are transmitted with priority over other packets, as a control scheme that determines an order of transmitting the packets with a priority of a predetermined value or more, and
 a comparison section that compares a strict priority rate that is a transmission rate of packets for which the strict priority control scheme is provisionally set by said schedule selector and a wireless transmission rate that is a transmission rate of said wireless packet transmission apparatus that is determined by a modulation scheme that is changed by said adaptive modulation controller;
 wherein, based on a comparison result obtained by said comparison section, said schedule selector determines whether to set the strict priority control scheme as the control scheme for the packets for which the strict priority control scheme is provisionally set, and
 wherein when the wireless transmission rate is higher than the strict priority rate, said schedule selector sets the strict priority control scheme as the control scheme for the packets for which the strict priority control scheme is provisionally set.

2. The wireless packet transmission apparatus according to claim 1,
 wherein when the wireless transmission rate is not higher than the strict priority rate, as the control scheme for the packets for which the strict priority control scheme is provisionally set, said schedule selector sets a weighted round robin control scheme, which indicates that the packets for which the strict priority control scheme is provisionally set are transmitted in an order that is determined by a ratio that is set by assigning weights in accordance with priorities of the packets for which the strict priority control scheme is provisionally set and other packets.

3. The wireless packet transmission apparatus according to claim 1,
 wherein when the wireless transmission rate is not higher than the strict priority rate, as the control scheme for the packets for which the strict priority control scheme is provisionally set, said schedule selector sets a weighted fair queuing control scheme which indicates that the packets for which the strict priority control scheme is provisionally set are transmitted in an order that is determined by a ratio that is set by assigning weights in accordance with priorities of the packets for which the strict priority control scheme is provisionally set and other packets, and sizes of the packets for which the strict priority control scheme is provisionally set and other packets.

4. The wireless packet transmission apparatus according to claim 1,
 wherein when the wireless transmission rate is not higher than the strict priority rate, as the control scheme for the packets for which the strict priority control scheme is provisionally set, said schedule selector sets a best effort control scheme which represents that the packets for which the strict priority control scheme is provisionally set are transmitted in an order of input thereof into said wireless packet transmission apparatus.

5. A packet priority control scheduling method that is applied to a wireless packet transmission apparatus that controls an order of transmitting packets with different priorities and also changes a modulation scheme of the packets in accordance with a status of a wireless line, comprising:

when the modulation scheme is changed, with respect to packets with a priority of a predetermined value or more among the packets, provisionally setting a strict priority control scheme by a schedule selector in the packet transmission apparatus, which indicates that the packets with a priority of a predetermined value or more are transmitted with priority over other packets, as a control scheme that determines an order of transmitting the packets with a priority of a predetermined value or more;

comparing a strict priority rate that is a transmission rate of packets for which the strict priority control scheme is provisionally set and a wireless transmission rate that is a transmission rate of said wireless packet transmission apparatus that is determined by the changed modulation scheme; and based on the comparison result, determining whether to set the strict priority control scheme as the control scheme for the packets for which the strict priority control scheme is provisionally set, wherein when the wireless transmission rate is higher than the strict priority rate, the strict priority control scheme is set as the control scheme for the packets for which the strict priority control scheme is provisionally set.

6. The packet priority control scheduling method according to claim 5, wherein when the wireless transmission rate is not higher than the strict priority rate, as the control scheme for the packets for which the strict priority control scheme is provisionally set, a weighted round robin control scheme, which indicates that the packets for which the strict priority control scheme is provisionally set are transmitted in an order that is determined by a ratio that is set by assigning weights in accordance with priorities of the packets for which the strict priority control scheme is provisionally set and other packets.

7. The packet priority control scheduling method according to claim 5, wherein when the wireless transmission rate is not higher than the strict priority rate, as the control scheme for the packets for which the strict priority control scheme is provisionally set, a weighted fair queuing control scheme, which indicates that the packets for which the strict priority control scheme is provisionally set are transmitted in an order that is determined by a ratio that is set by assigning weights in accordance with priorities of the packets for which the strict priority control scheme is provisionally set and other packets, and sizes of the packets for which the strict priority control scheme is provisionally set and other packets.

8. The packet priority control scheduling method according to claim 5, wherein when the wireless transmission rate is not higher than the strict priority rate, as the control scheme for the packets for which the strict priority control scheme is provisionally set, a best effort control scheme which indicates that the packets for which the strict priority control scheme is provisionally set are transmitted in an order of input thereof into the wireless packet transmission apparatus is set.

\* \* \* \* \*